Sept. 15, 1931. A. J. JANSSON ET AL 1,823,429

ENGINE MOUNTING

Filed Jan. 27, 1928

Inventors
Axel J. Jansson &
George W. Smith

By Blackmore, Spencer & Hulls
Attorneys

Patented Sept. 15, 1931

1,823,429

UNITED STATES PATENT OFFICE

AXEL J. JANSSON AND GEORGE W. SMITH, OF FLINT, MICHIGAN, ASSIGNORS TO GENERAL MOTORS CORPORATION, OF DETROIT, MICHIGAN, A CORPORATION OF DELAWARE

ENGINE MOUNTING

Application filed January 27, 1928. Serial No. 249,913.

This invention relates to motor vehicles, and more particularly to an improvement in mountings or connections by which an engine is stably secured in the chassis frame. Although not limited in its use, the invention is particularly intended for employment at the front of an engine and for mounting the fore part of an engine at two points.

It is one of the objects of the invention to provide a connection embodying elastic cushioning material, which permits a limited movement in all directions, and which insulates the engine from the frame and avoids metal to metal contact, so that engine is relieved from the severity of road shocks, and engine vibrations and noises are cushioned and dampened out without being transmitted through the frame and body, thereby eliminating disagreeable sounds, vibratory reactions and strains on the vehicle parts, as well as annoyance to occupants of the vehicle.

A further object is to provide a mounting which will be simple in design, economical to manufacture, and which may be readily assembled or disassembled, so that the replacement of parts or the complete removal of the engine from the chassis frame may be easily and quickly accomplished.

A further object of the invention is to eliminate the necessity of casting supporting arms or legs integral with the engine block by providing a pressed metal plate or cover for attachment at the front of the engine, to enclose the timing gear mechanism, and which embodies laterally projecting arms at each side, by which the engine is mounted in the frame. By this arrangement the engine block is freed of awkward projections, so that it is less cumbersome to handle, less liable to breakage, and cheaper to produce and machine.

A further object of the invention is to provide retainers for the elastic material, so shaped as to avoid wear or the possibility of a shearing action on the elastic material as it undergoes deformation in the course of use. In case of certain types of retainers, it is proposed to key the retainer parts together to avoid misalignment.

Figure 1:
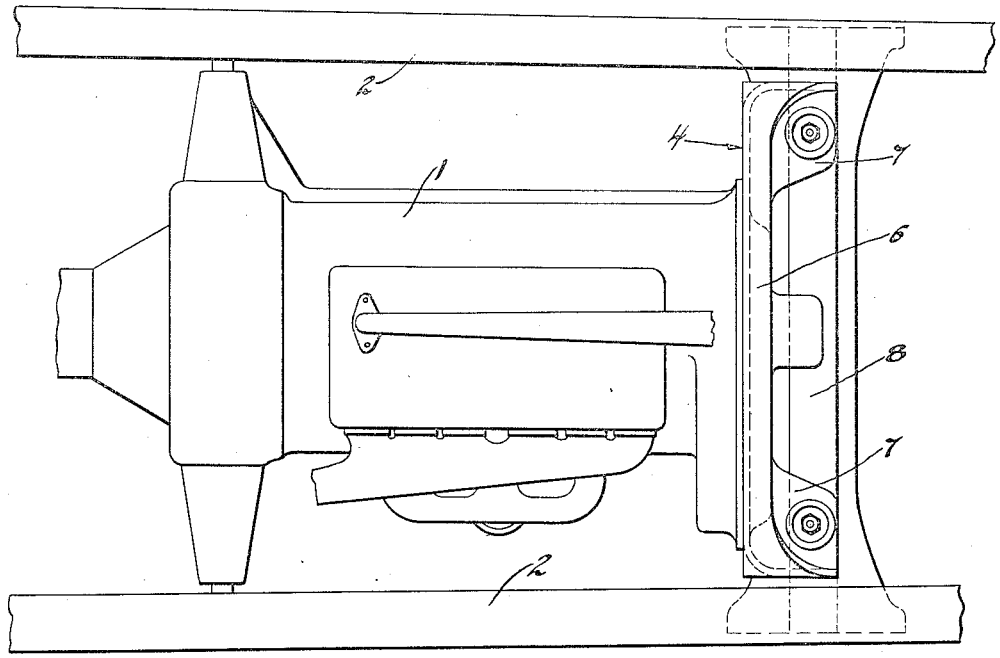
Figure 4:
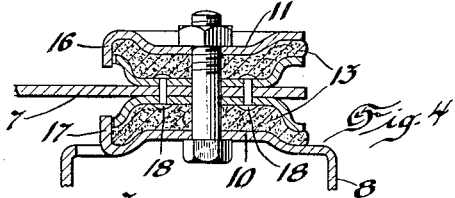
Figure 3:
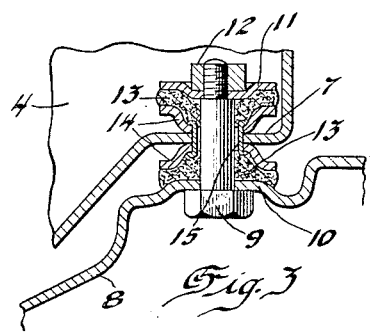
Figure 2:
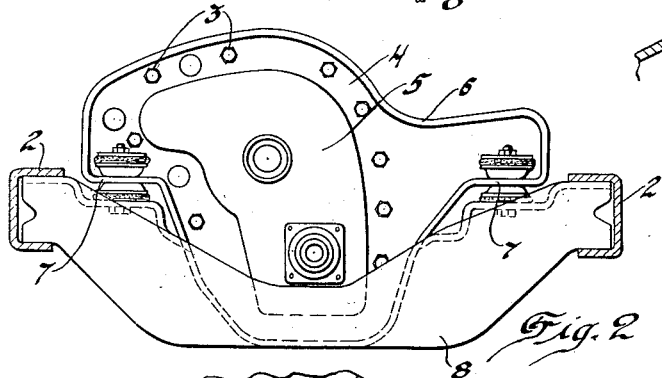
Figure 6:
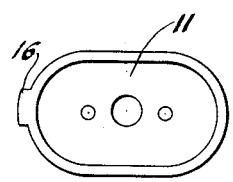
Figure 5:
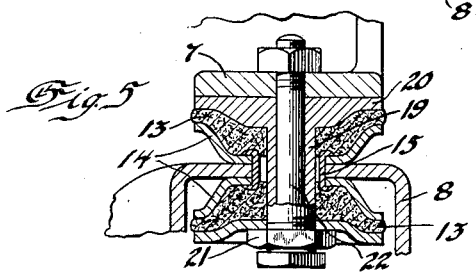

The above and other incidental objects and advantages will be apparent from the following specification and the accompanying drawings, wherein Fig. 1 is a top plan view of an automobile engine mounted in a chassis frame in accordance with the present invention; Fig. 2 is a transverse section through the chassis frame, showing the mounting in front elevation; Figs. 3, 4 and 5 are detail sectional views showing alternative forms of the resilient connection between the engine and chassis frame, and Fig. 6 is a plan view of one type of retainer member.

Referring to the drawings the reference character 1 indicates an internal combustion engine, such as is used for propelling motor vehicles, shown as being provided with a pair of lateral arms or legs on either side, at the rear thereof, which are mounted on the longitudinally extending chassis frame members 2—2. Secured to the front of the engine by a series of bolts 3, is a plate member 4, preferably stamped or pressed from sheet metal, and having a bulged or pressed out portion 5, which forms a casing or housing to enclose the conventional timing gear mechanism located at the front of the engine and driven from the engine crankshaft. This gear casing member 4 is also formed with portions that project beyond either side of the engine, to constitute motor supporting legs, and about the margins of the plate, a continuous flange 6 is provided to strengthen and reinforce the plate. For mounting purposes and to render the fastening attachments more accessible for assembly, the flange 6 may be enlarged and projected forwardly as at 7, and such enlarged portions are connected to the transverse frame member 8 as will now be described.

In the connection shown in Figure 3 an attachment bolt 9 extends upwardly through a raised or embossed portion 10 on the transverse member 8, passes through an opening in the flanged portion 7, and carries at its upper end a centrally embossed disc or washer 11, abutting against a shoulder on the bolt and held in place by a screw threaded nut 12. Interposed between the washer 11 and boss 10, and on opposite sides of the flanged portion 7, are a pair of discs or pads 13 of elastic material, such as rubber, rubberized fabric, felt or the like, and which are preferably of concavo-convex form, and into the concavities of which the embossed portions extend. The pads 13 are received within retainer cups 14, having outwardly flaring walls of substantially ogee shape in section, so as to eliminate sharp cutting edges which would have a tendency to dig into and shear off portions of the elastic material. A hollow rivet or sleeve 15 extends through the opening of the flanged portion, and securely holds the cups 14 back to back on opposite sides of the flange. The diameter of the opening through the hollow rivet is larger than that of the bolt, so that ample clearance is provided to accommodate movement of the parts in any direction, which movement is permitted by the deformation of the elastic bodies to cushion strains and stresses caused by road shocks, frame weaving, engine vibrations or the like.

While in most cases the pads of elastic material may be round or of circular outline, it may be desirable in certain installations to form these pads of other shape. For instances, they may be made oblong or ovular, and in such event the retainer cups and their embossed portions and will be similarly formed, as is illustrated by the washer in Fig. 6. In order to locate the parts in proper place and hold them against accidental misalignment, a tongue 16 is bent down into engagement within a notch formed in the edge of the cup as is clearly shown in Fig. 4. In like manner a tongue 17 is struck up from the frame member, for engagement with the notched edge of the cup on the underside of the flange 7. Fig. 4 also shows retainer cups held back to back on opposite sides of the flanged portion 7, by means of rivets 18, in lieu of the hollow rivet arrangement shown in Fig. 3.

It will be understood that instead of locating the elastic parts on opposite sides of the flanged timing gear cover, they may readily be placed on opposite sides of the frame member. An arrangement of this sort is illustrated in Fig. 5 in which case it will be found advantageous to employ a hollow bolt 19 having a head 20 with a central enlarged portion to fit into the uppermost elastic pad. A nut 21 at the end of the bolt holds the pads and their retainers in assembled relation, and permits their assembly on the chassis prior to the time the engine is mounted thereon by attachment studs 22, or the removal of the engine from the chassis without disturbing the relation of the cushion pads.

It will be understood that there is no intention to limit the invention to exact details shown, and that various modifications may be made as come within the scope of appended claims.

Having described our invention we claim:

1. In combination with a supporting member and a member to be supported, of a pair of cups having outwardly flaring sides, a hollow rivet securing said cups back to back on opposite sides of one of said members, concavo-convex pads of elastic material disposed within said cups convex elements associated with the other of said members and extending in the pads and a fastening stud extending through said hollow rivet and connecting said elements to each other.

2. In combination with a supporting member and a member to be supported, of a pair of outwardly flared cups secured back to back on one of said members, concavo-convex bodies of resilient cushioning material disposed within said cups, a boss formed on the other of said members and extending into the concavity of one of said resilient bodies, a washer extending into the concavity of the other of said resilient bodies and a fastening bolt securing the several parts in assembled relation.

3. The combination set forth in claim 2 wherein said cups are secured together by a hollow rivet through which the bolt passes.

4. The combination of claim 2 wherein said washer and adjacent cup are keyed to each other.

5. The combination of claim 2 together with an angular tongue formed on said washer for engagement within an opening in the adjacent cup.

6. In combination with a supporting member and a member to be supported, of an outwardly flaring cup element secured to one member, a concavo-convex resilient body disposed within said cup, an element associated with the other member having an embossed portion extending into the concavity of the resilient body and an angularly disposed tongue formed on one of said elements and engaged in an opening formed in the other element to hold said elements against relative rotation.

7. In combination with a supporting member and a supported member, of resilient supporting means including a pair of outwardly flaring cups, a hollow rivet securing said cups back to back on opposite sides of one of said members, concavo-convex pads of resilient material disposed within said cups, a hollow bolt extending through the rivet and being of less diameter than the opening through the rivet, and having its head resting within the concavity of one of said resilient pads, a washer carried by said bolt and resting in the concavity of the other of said pads, a nut on the end of the bolt holding the parts in assembled relation, and an attachment stud passing through said hollow bolt to detachably secure the other of said members to said resilient supporting means.

8. In a motor vehicle the combination with a chassis frame and an engine to be mounted therein, of a pressed sheet metal plate secured to the engine and having laterally projecting arms on either side thereof provided with flanged portions, studs connecting said flanged portions to portions of the chassis frame, a concavo-convex pad of elastic material interposed between said portions, a washer carried at the end of each of said studs, a concavo-convex pad of elastic material interposed between said washer and one of said portions, outwardly flaring retainer cups for said elastic pads, and a hollow rivet securing said retainer cups in back to back relation on opposite sides of the portion intermediate said pads, and through the opening in which the connecting stud loosely projects.

In testimony whereof we affix our signatures.

AXEL J. JANSSON.
GEORGE W. SMITH.